United States Patent [19]

Murofushi et al.

[11] Patent Number: 4,967,924
[45] Date of Patent: Nov. 6, 1990

[54] COVER MOUNTING ASSEMBLY FOR ELECTRICAL JUNCTION BOX

[75] Inventors: Haruyoshi Murofushi, Kosai; Yoshitaka Asano, Hamamatsu, both of Japan

[73] Assignee: Seydel Companies

[21] Appl. No.: 372,017

[22] Filed: Jun. 27, 1989

[30] Foreign Application Priority Data

Jul. 1, 1988 [JP] Japan .................. 63-86639[U]

[51] Int. Cl.$^5$ ............................... H02G 3/08
[52] U.S. Cl. .................... 220/3.8; 220/335; 220/338
[58] Field of Search ............ 220/335, 338, 3.8

[56] References Cited

U.S. PATENT DOCUMENTS

| | | | |
|---|---|---|---|
| 4,466,541 | 8/1984 | Tabler et al. | 220/338 |
| 4,540,090 | 9/1985 | Gelardi et al. | 220/338 |
| 4,549,670 | 10/1985 | Trendler | 220/338 |
| 4,663,803 | 5/1987 | Gora | 220/338 |
| 4,684,017 | 8/1987 | Watanabe et al. | 220/338 |

Primary Examiner—Joseph Man-Fu Moy

[57] ABSTRACT

A cover mounting assembly for use in an electrical junction box comprising a junction box body and a cover mounted thereon to cover it, the cover has a locking rod suspended from its one side wall so as to extend substantially in parallel relationship therewith, and the junction box body has a locking rod holder formed integrally therewith and which is comprised of a pair of holding pieces in which the locking rod is fitted detachably and in such a manner that it can be turned, the locking rod having a projection formed thereon and adapted to abut against the upper part of one of the holding pieces of the locking rod holder when the cover is opened, said locking rod holder having an opening formed therein in the direction that the locking rod is turned about the point of abutment.

4 Claims, 6 Drawing Sheets

COVER MOUNTING ASSEMBLY FOR ELECTRICAL JUNCTION BOX

BACKGROUND OF THE INVENTION

1. Field of the Invention

This invention relates to a cover mounting assembly for use in an electrical junction box and, more particularly, to a cover mounting assembly wherein damage of the cover mounting portion can be prevented.

2. Description of the Prior Art

Electrical junction boxes such as fuse boxes and relay boxes, etc. for use with electric wirings of automobiles consist of a junction box body and a cover. The junction box body accommodates a wiring board such as a bus-bar wiring board or a printed substrate ect. The junction box has a connection terminal leading from the wiring board, and a connector housing for protecting the terminal, which is molded integrally on the outside thereof.

The above-mentioned cover has a locking rod supported by a plurality of supporting pieces, which are suspended from one side wall thereof, so as to extend substantially in parallel with the side wall. Whilst, the above-mentioned junction box body has a flexible locking rod holder which is formed on its side wall opposite to the locking rod and which has an opening formed in the upper part thereof. When the locking rod is thrusted into the opening, the locking rod holder is bent outwardly to complete the insertion thereof. Therefore, by fitting the locking rod in the locking rod holder so that it may be turned, the above-mentioned cover is mounted on the junction box body in such a manner that it can be opened and shut freely.

The cover of the electrical junction box of such a construction is opened to such an extent that the supporting pieces are abutted against the upper surface of the locking rod holder to enable the mounting or the replacement of parts such as a fuse and a relay etc. within the junction box body to be carried out.

Further, in case it is desired to remove the cover from the body, the cover can be removed by moving it upwardly as it is so as to enlarge the opening in the locking rod holder by the locking rod itself.

However, when an external force is applied to the cover to open it further from the position where the supporting pieces are abutted against the upper surface of the locking rod holder, the holder is forcibly deformed by the locking rod. Therefore, the conventional cover of the junction box has a drawback in that the weakest portion of the locking rod holder cannot be recovered to its original state in some cases and is liable to be damaged.

The present invention has for its object to provide a cover mounting assembly for use in an electrical junction box wherein the cover is not damaged even if an excessive external force is applied to the cover to open it.

SUMMARY OF THE INVENTION

To achieve the above-mentioned object, according to the present invention, there is provided a cover mounting assembly for use in an electrical junction box comprising a junction boxy body and a cover mounted thereon to cover it, wherein the cover has a locking rod suspended from its one side wall so as to extend substantially in parallel relationship therewith, and the junction box body has a locking rod holder formed integrally therewith and which is comprised of a pair of holding pieces in which the locking rod is fitted detachably and in such a manner that it can be turned, the locking rod having a projection formed thereon and adapted to abut against the upper part of one of the holding pieces of the locking rod holder when the cover is opened, the locking rod holder having an opening formed therein in the direction that the locking rod is turned about the point of abutment.

DESCRIPTION OF THE PREFERRED EMBODIMENTS

Figure 5:
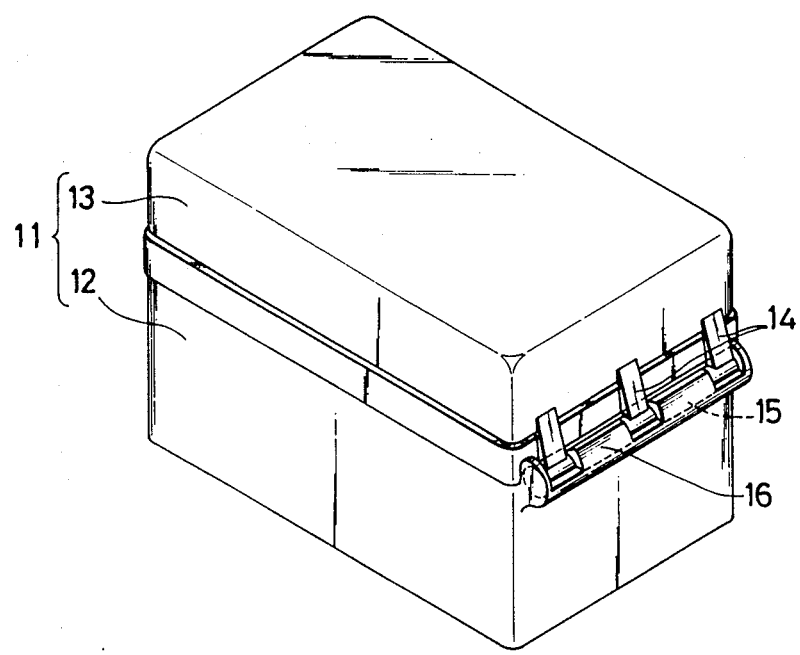
FIG. 5 is a perspective view of a prior art electrical junction box.
Figure 6:
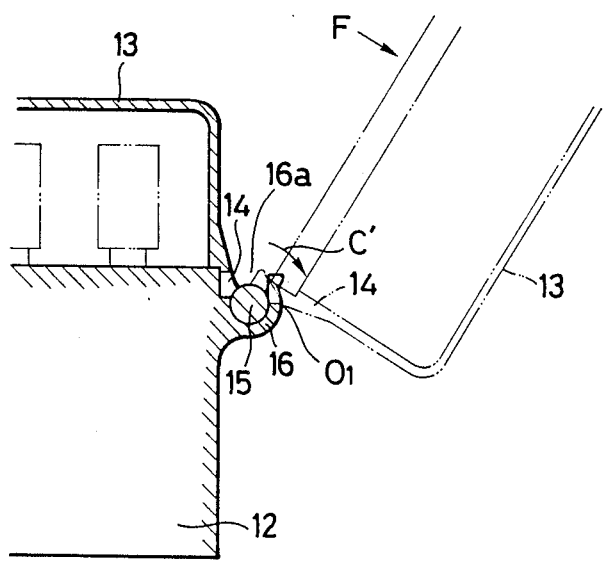
FIG. 6 is a sectional view showing the principal parts of the prior are cover mounting assembly for the electrical junction box.

A prior art electrical junction box 11 shown in FIGS. 5 and 6 consists of a junction box body 12, and a cover 13. The cover 13 has a locking rod 15 supported by a plurality of supporting pieces 14, which are suspended from one side wall thereof, so as to extend substantially in parallel with the side wall. Whilst, the junction box body 12 has a flexible locking rod holder 16 which is formed on its side wall opposite to the locking rod and which has an opening 16a formed in the upper part thereof. When the locking rod 15 is thrusted into the opening 16a, the locking rod holder 16 is bent outwardly to complete the insertion thereof. Therefore, by fitting the locking rod 15 in the locking rod holder 16 so that it may be turned, the cover 13 is mounted on the junction box body in such a manner that it can be opened and shut freely.

In the electrical junction box of such a construction, when parts such as a fuse and a relay, etc. within the junction box body 1 are mounted or replaced, it is necessary to open the cover 13. The cover 13 is opened until the supporting pieces 14 are abutted against the upper surface of the locking rod holder 16, and then the above-mentioned operation is conducted.

Further, in case it is desired to remove the cover 13 from the junction box body 12, the cover 13 can be removed by moving it in open condition as shown in FIG. 6 upwardly as it is so as to enlarge the opening 16a in the locking rod holder 16 by the locking rod 15 itself.

However, when an external force is applied to the cover 13 in the direction shown by arrow F to open it further from the position where the supporting pieces 14 are abutted against the upper surface of the locking rod holder 16, the supporting pieces 14 exerts a leverage about a point "0" of abutment of the supporting pieces 14 against the locking rod holder 16, which serves as a fulcrum. Thus, this conventional cover has a drawback in that the locking rod holder 16 is forcibly deformed by the locking rod 15 in the direction shown by arrow C', i.e., in the same direction as that shown by arrow F.

Figure 1:
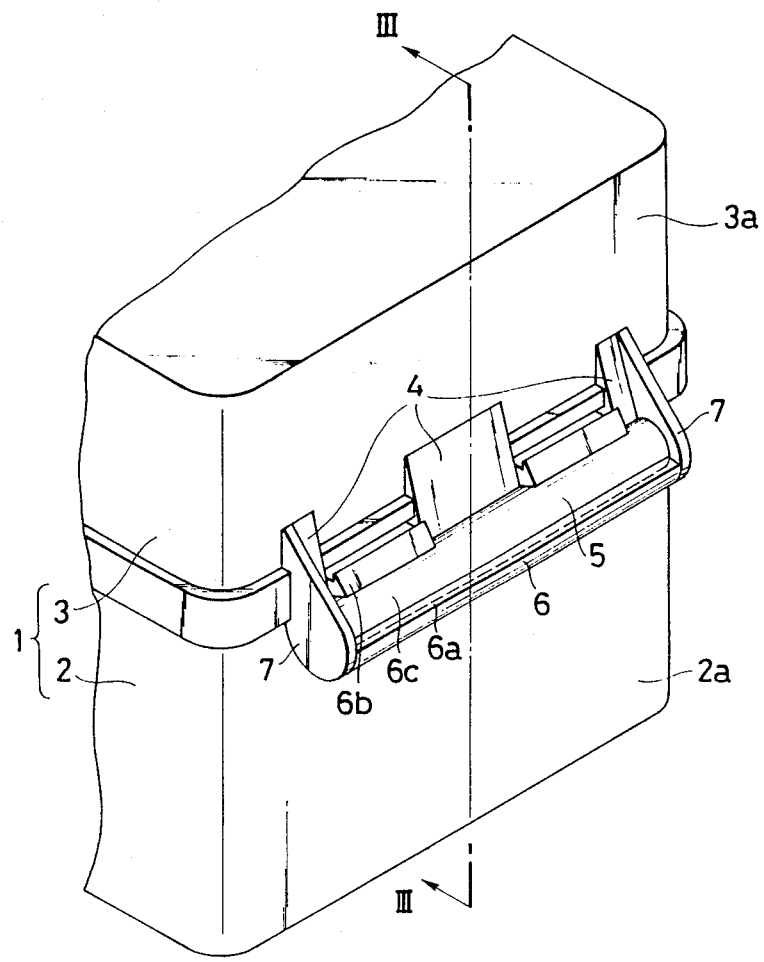
FIG. 1 is a perspective view of one embodiment of the cover mounting assembly for the electrical junction box according to the present invention, when assembled.
Figure 2:
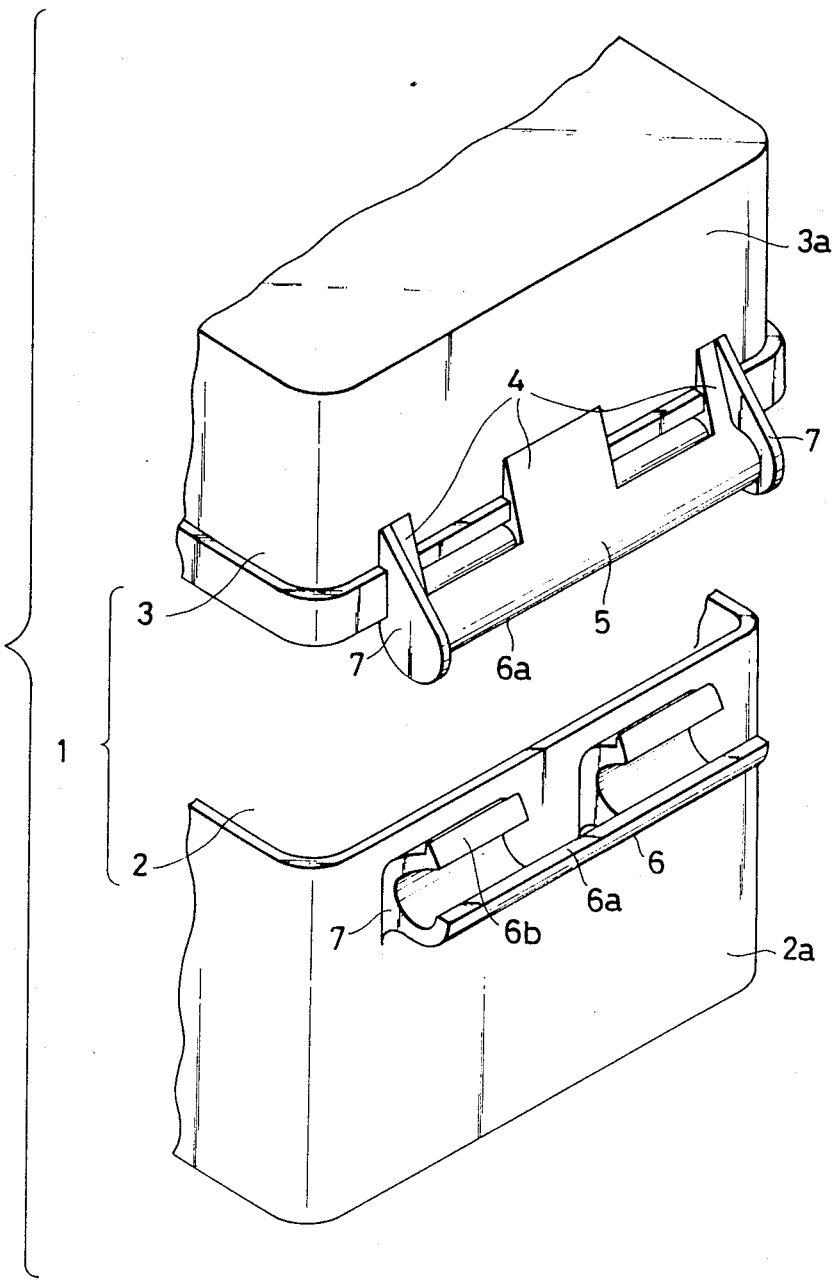
FIG. 2 is a disassembled perspective view of the same.

The present invention will now be described by way of example only with reference to the accompanying drawings. FIGS. 1 and 2 show the principal parts of a cover mounting assembly for use in an electrical junction box according to the present invention. FIG. 1 shows a cover mounted on a junction box body. FIG. 2 is a perspective view showing the cover detached from the junction box body. In these drawings, reference numeral 2 denotes a junction box body, and 3 a cover. An electrical junction box 1 is formed by the junction box body 2 and the cover 3. The cover 3 has a cylindrical locking rod 5 supported by a plurality of supporting pieces 4, which are formed integrally therewith as projections from one side wall 3a thereof, so as to extend substantially in parallel with the side wall. Whilst, the junction box body 2 has a substantially U-shaped locking rod holder 6 formed on the side wall 6a opposite to the above-mentioned locking rod 5 and which has a pair of holding or clamping pieces 6a and 6b. The holding pieces 6a and 6b of the locking rob holder 6 are formed integrally with the junction box body 2 by injection molding of a resin, and have a flexibility. The holding pieces 6a and 6b form a cylindrical cavity or space in which the locking rod 5 is to be fitted. Formed between the holding piece 6a of the locking rod holder 6 which is located outside and the holding piece 6b which is located inside is an opening 6c through which the locking rod 5 can be attached and detached. The locking rod 5 has positioning ribs 7 formed integrally with both ends thereof and which serve to position the junction box body 2 and the cover 3.

Figure 3:
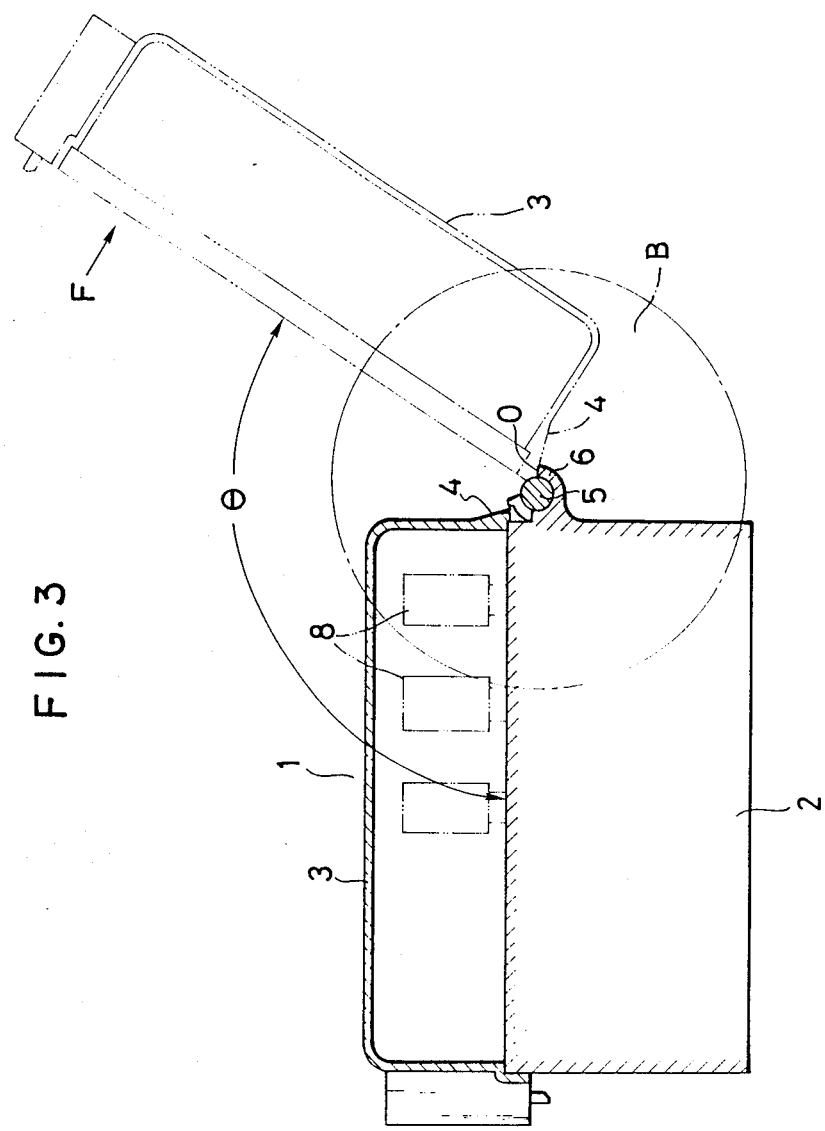
FIG. 3 is a sectional view of the same taken along line 3—3 in FIG. 1.
Figure 4:
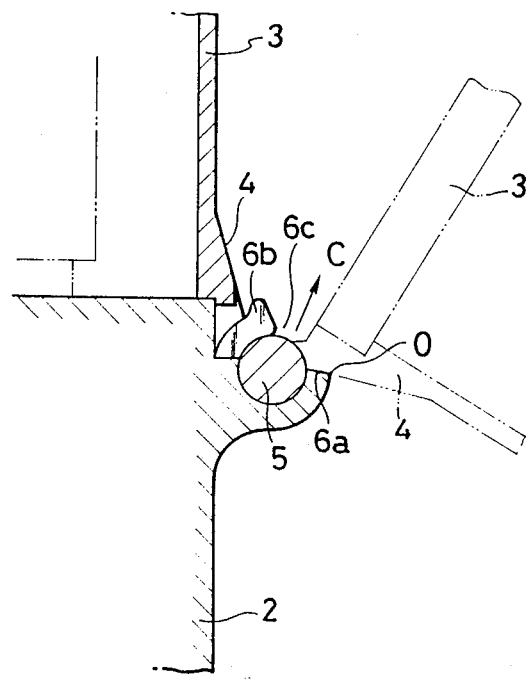
FIG. 4 is an enlarged view of "B" portion in FIG. 3.

FIG. 3 shows the conditions of the electrical junction box 1 before and after the cover 3 is opened. When the cover 3 is opened by an angle "θ" as shown in FIG. 3, the supporting pieces 4 are abutted against the holding piece 6a of the locking rod holder 6 at a point "0". Since the opening 6c in the locking rod holder 6 is formed so as to be narrower than the diameter of the locking rod 5, the cover 3 is stopped at this position and kept in full open condition. Further, the opening 6c in the locking rod holder 6 is formed in the direction that the locking rod 5 can be turned about the point "0". Stating more specifically, when the electrical junction box 1 is put horizontally, the opening 6c of the locking rod holder 6 is defined between the position of a long hand and that of a short hand of a watch which indicates 3 or 4 O'clock. In this condition, mounting and replacement of parts 8 such as a fuse and a relay, etc. can be made. In case an external force which is more than a predetermined value is applied to the cover 3 in the direction shown by arrow F, a force due to the leverage is exerted on the locking rod 5 about the point "0" of abutment of the supporting pieces 5 against the holding piece 6a of the locking rod holder, which serves as a fulcrum. As a result, the locking rod 5 is turned about the point "0" to thereby enlarge the opening 6c against the flexibility of the holding piece 6b, thus disengaging from the locking rod holder 6 in the direction shown by arrow c in FIG. 4. Therefore, the cover 3 can be detached from the junction box body 2 without being subjected to any undue force, thus giving no damage to the cover mounting assembly.

In the embodiment of the present invention shown in the drawing, the supporting pieces 4 are used as the projections serving to abut against the fulcrum "0", however, the locking rod 5 may be formed with projections in place of the supporting pieces 4. The angle "θ" shown in FIG. 3 may be increased or decreased by altering the positions or the shape of the supporting pieces 4.

As described hereinabove, according to the present invention, since the electrical junction box consisting of the junction box body and the cover is arranged such that, in case an external force which is more than a predetermined value is applied to the cover when it is in full open condition, the cover is detached from the body without being subjected to any undue force so that an effect of preventing damage of the cover mounting portion can be achieved.

It is to be understood that the foregoing description is merely illustrative of a preferred embodiment of the present invention, and that the scope of the invention is not to be limited thereto, but is to be determined by the scope of the appended claim.

What is claimed is:

1. A cover mounting assembly for use in an electrical junction box, comprising:
   a junction box body;
   a cover for covering said junction block body;
   a locking rod suspended from a side wall of said cover extending substantially in parallel relationship therewith;
   a locking rod holder including independently flexible first and second holding pieces integrally formed with said junction box body said holding pieces being formed with a cylindrical cavity for detachably receiving the locking rod concentrically therein such that it can be turned when located therein for opening and closing the cover;
   said first holding piece providing a trough-like, semicircular, support for circumferentially encasing a portion of said locking rod within the cavity and said second holding piece cooperating with said first holding piece to circumferentially encase an additional portion of said locking rod within the cavity which is not concurrently encased by said first holding piece;
   said holding pieces having spaced apart end portions forming an opening in communication with the cavity and being movable with respect to each other in response to a predetermined force for separating the end portions thereby allowing the locking rod to pass through the opening when the end portions are movably separated by said force;
   said locking rod including a radial projection formed thereon so as to abut against the movable end portion of the first holding piece when the cover is fully opened, said radial projection bearing against the end portion of the first holding piece for pivoting the locking rod when the cover is moved beyond the fully opened position, such that the locking rod bears against the holding pieces with a force sufficient to cause said holding pieces to move apart and to thereby separate the end portions of the holding pieces sufficiently that the locking rod moves out of the cavity for removing the cover, said holding pieces being sufficiently resilient so as not to be permanently deformed upon removal of said locking piece from the cavity.

2. A cover mounting assembly according to claim 1 wherein said opening has a width of approximately one-quarter of the circumference of the locking rod.

3. A cover mounting assembly according to claim 1 wherein said first holding piece encases approximately one-half of the circumference of the locking rod.

4. A cover mounting assembly according to claim 1 wherein said second holding piece encases approximately one-quarter of the circumference of the locking rod.

* * * * *

UNITED STATES PATENT AND TRADEMARK OFFICE
CERTIFICATE OF CORRECTION

PATENT NO. : 4,967,924
DATED : November 6, 1990
INVENTOR(S) : MUROFUSHI et al.

It is certified that error appears in the above-identified patent and that said Letters Patent is hereby corrected as shown below:

On the title page, the Assignee should be changed from reading "Seydel Companies" to read --Yazaki Corporation--.

Signed and Sealed this

Seventh Day of April, 1992

Attest:

HARRY F. MANBECK, JR.

Attesting Officer Commissioner of Patents and Trademarks